United States Patent
Lin

(10) Patent No.: US 12,146,549 B2
(45) Date of Patent: Nov. 19, 2024

(54) RINGLIKE FABRIC BELT TRACTION CHAIN AND MANUFACTURING METHOD THEREOF

(71) Applicant: Zhenghong Lin, Shanghai (CN)

(72) Inventor: Zhenghong Lin, Shanghai (CN)

(73) Assignee: SHANGHAI JINLI SPECIAL ROPE CO., LTD., Shanghai (CN)

( * ) Notice: Subject to any disclaimer, the term of this patent is extended or adjusted under 35 U.S.C. 154(b) by 0 days.

(21) Appl. No.: 18/641,376

(22) Filed: Apr. 21, 2024

(65) Prior Publication Data
US 2024/0263684 A1    Aug. 8, 2024

(51) Int. Cl.
*F16G 13/20*    (2006.01)

(52) U.S. Cl.
CPC .................................... *F16G 13/20* (2013.01)

(58) Field of Classification Search
CPC ....................................................... F16G 13/20
See application file for complete search history.

(56) References Cited

FOREIGN PATENT DOCUMENTS

| | | | | |
|---|---|---|---|---|
| CN | 101641532 B | * | 8/2012 | ............. B66C 1/125 |
| EP | 3869063 A1 | * | 8/2021 | ............. D05B 23/00 |
| WO | WO-2020233985 A1 | * | 11/2020 | |

OTHER PUBLICATIONS

Translation of EP-3869063 (Year: 2021).*
Translation of WO-2020233985 (Year: 2020).*
Translation of CN-101641532 (Year: 2012).*

* cited by examiner

*Primary Examiner* — Bobby Yeonjin Kim

(57) ABSTRACT

The present disclosure provides a ringlike fabric belt traction chain and a manufacturing method of the ringlike fabric belt traction chain. A ringlike fabric belt traction chain includes several ringlike fabric belts which are fastened in sequence, wherein each ringlike fabric belt includes: a fabric layer, wherein the fabric layer has a first end and a second end, and the fabric layer is coiled and stacked to form a ringlike main body; and a first seam, wherein the first seam connects the first end and the second end of the fabric layer to the ringlike main body. During use, each fabric layer is repeatedly coiled and stacked, so that each position of the ringlike main body has a plurality of layers of portion fabric layers. The thickness of each position of the ringlike main body can be increased, thereby improving the strength of each position of the ringlike main body.

14 Claims, 5 Drawing Sheets

RINGLIKE FABRIC BELT TRACTION CHAIN AND MANUFACTURING METHOD THEREOF

TECHNICAL FIELD

The present disclosure relates to the technical field of printing supplies, and in particular, to a ringlike fabric belt traction chain and a manufacturing method thereof.

BACKGROUND OF THE INVENTION

In the fields of fishery, mining, animal husbandry, and the like, a winch is usually used to lift and drag heavy objects. A steel cable and an iron chain are generally used for lifting in the winch. The steel cable and the iron chain have high strength and rigidity and can lift the heavy objects. However, the steel cable and the iron chain are generally made of a metal such as steel, and have good thermal and electrical conductivities. In some special use environments, for example, under conditions of requiring insulation and avoiding thermal conduction, neither the steel cable nor the iron chain can meet the use requirements. Meanwhile, the steel cable and the iron chain have the disadvantages of heavy weight, difficult transportation, and the like. Therefore, using the steel cable and the iron chain for traction causes higher energy consumption, leading to a waste of resources.

In order to solve the above problems, the present disclosure provides a ringlike fabric belt traction chain which is made of macromolecular polymerized fibers, and a manufacturing method of the ringlike fabric belt traction chain. The ringlike fabric belt traction chain has the advantages of flexibility, high traction strength, light weight, insulation, thermal isolation, and the like, and is safer to use.

SUMMARY OF THE INVENTION

In order to overcome the shortcomings of the prior art, the present disclosure provides a ringlike fabric belt traction chain and a manufacturing method of the ringlike fabric belt traction chain. The ringlike fabric belt traction chain has the advantages of flexibility, high traction strength, light weight, insulation, thermal isolation, and the like, and is safer to use.

The technical solution adopted by the present disclosure to solve the technical problem is as follows.

A ringlike fabric belt traction chain, includes several ringlike fabric belts which are fastened in sequence, wherein each ringlike fabric belt includes:

a fabric layer, wherein the fabric layer has a first end and a second end, and the fabric layer is coiled and stacked to form a ringlike main body; and a first seam, wherein the first seam connects the first end and the second end of the fabric layer to the ringlike main body.

As the improvement of the present disclosure, the ringlike main body is a Mobius ring which has a main body part and a spiral part; the fabric layer is stacked above and below the main body part in sequence; and the fabric layer is twisted and stacked at the spiral part.

As the improvement of the present disclosure, a spiral angle of the spiral part is 180 degrees.

As the improvement of the present disclosure, the first end of the fabric layer is fixed to an inner surface of the ringlike main body, and the second end of the fabric layer is clamped and fixed between two adjacent fabric layers located at upper and lower positions.

As the improvement of the present disclosure, each ringlike fabric belt further includes a second seam; and the second seam and the first seam are oppositely arranged on two sides of a center of the ringlike main body.

As the improvement of the present disclosure, the first seam is repeatedly threaded through each fabric layer that forms the main body part, and the second seam is repeatedly threaded through each fabric layer that forms the spiral part.

As the improvement of the present disclosure, both the first seam and the second seam extend in a direction where a centerline of the ringlike main body is located.

As the improvement of the present disclosure, the fabric layer, the first seam, and the second seam are all made of polyethylene fibers with an ultra-high molecular weight.

The present disclosure also provides a manufacturing method of a ringlike fabric belt traction chain, including providing several ringlike fabric belts, and fastening the ringlike fabric belts in sequence to form the traction chain, wherein each ringlike fabric belt includes:

a fabric layer, wherein the fabric layer has a first end and a second end, and the fabric layer is coiled and stacked to form a ringlike main body; and a first seam, wherein the first seam connects the first end and the second end of the fabric layer to the ringlike main body.

As the improvement of the present disclosure, the ringlike main body is a Mobius ring which has a main body part and a spiral part; the fabric layer is stacked above and below the main body part in sequence; and the fabric layer is twisted and stacked at the spiral part.

As the improvement of the present disclosure, a spiral angle of the spiral part is 180 degrees.

As the improvement of the present disclosure, the first end of the fabric layer is fixed to an inner surface of the ringlike main body, and the second end of the fabric layer is clamped and fixed between two adjacent fabric layers located at upper and lower positions.

As the improvement of the present disclosure, each ringlike fabric belt further includes a second seam; and the second seam and the first seam are oppositely arranged on two sides of a center of the ringlike main body.

As the improvement of the present disclosure, the first seam is repeatedly threaded through each fabric layer that forms the main body part, and the second seam is repeatedly threaded through each fabric layer that forms the spiral part.

As the improvement of the present disclosure, both the first seam and the second seam extend in a direction where a centerline of the ringlike main body is located.

As the improvement of the present disclosure, the fabric layer, the first seam, and the second seam are all made of polyethylene fibers with an ultra-high molecular weight.

The present disclosure has the following beneficial effects. By the arrangement of the above structure, during use, each fabric layer is repeatedly coiled and stacked, so that each position of the ringlike main body has a plurality of layers of portion fabric layers. The thickness of each position of the ringlike main body can be increased, thereby improving the strength of each position of the ringlike main body. The first seam can penetrate through the ringlike main body and connect the first end and the second end to a surface of the ringlike main body. This can effectively fix the first end and the second end, and improve the strength of the product. Furthermore, the ringlike fabric belt composed of the fabric layer and the first seam is prepared from a fabric, so that the ringlike fabric belt has the characteristics of insulation, thermal isolation, and the like, and is light in weight.

BRIEF DESCRIPTION OF DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE INVENTION

Figure 1:
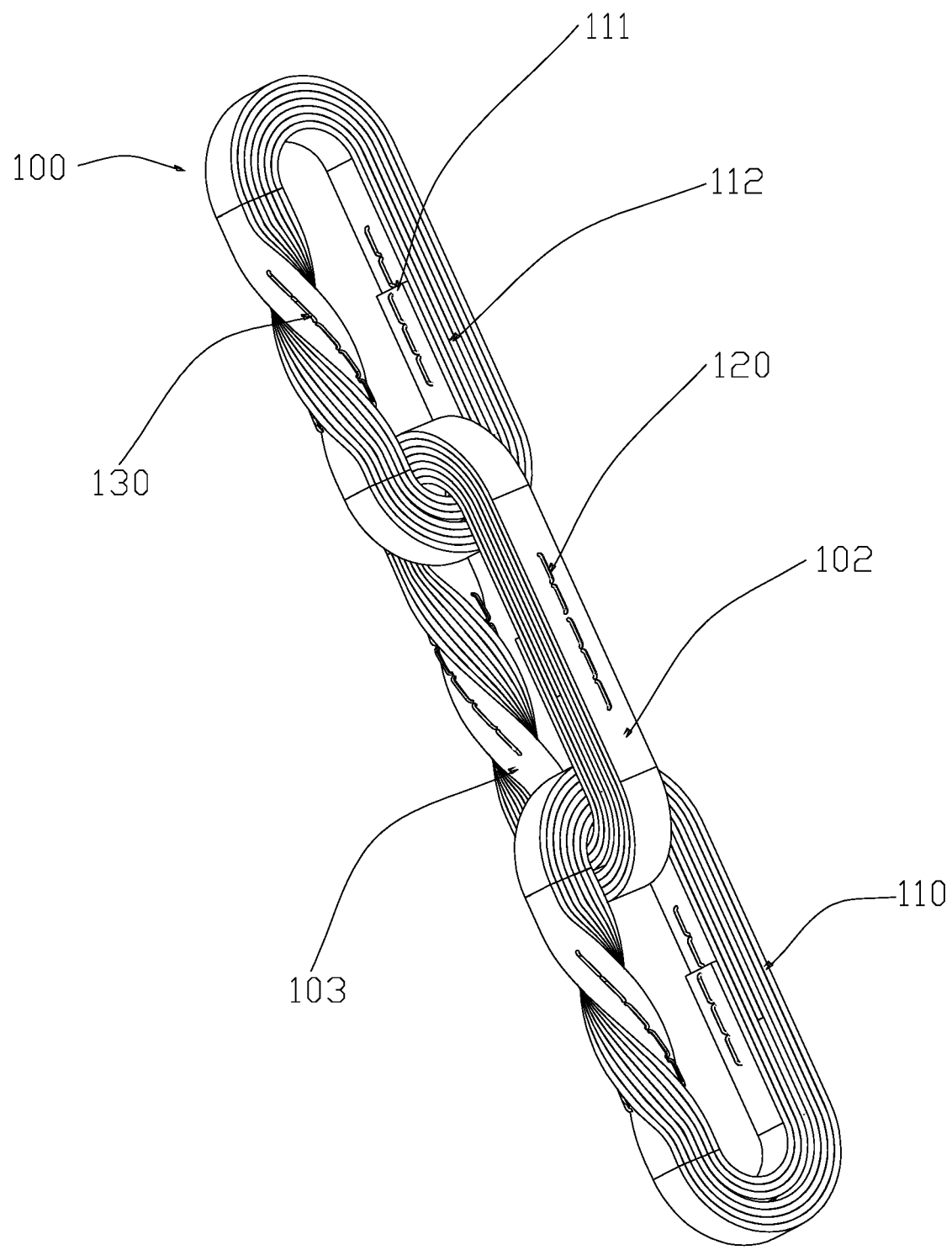
FIG. 1 is a schematic diagram of an entire structure of a traction chain of the present disclosure in one angle.
Figure 2:
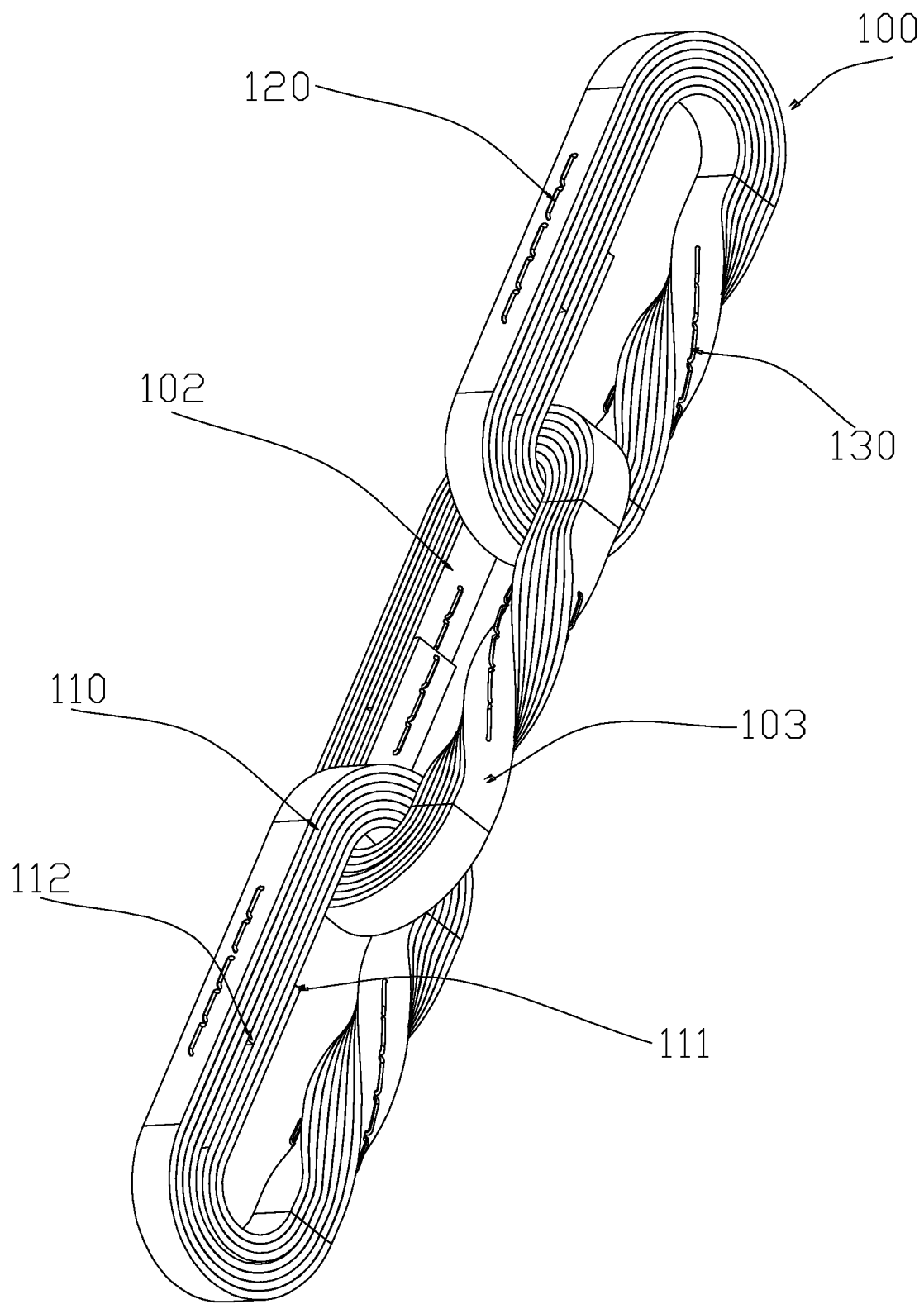
FIG. 2 is a schematic diagram of an entire structure of a traction chain of the present disclosure in another angle.
Figure 3:
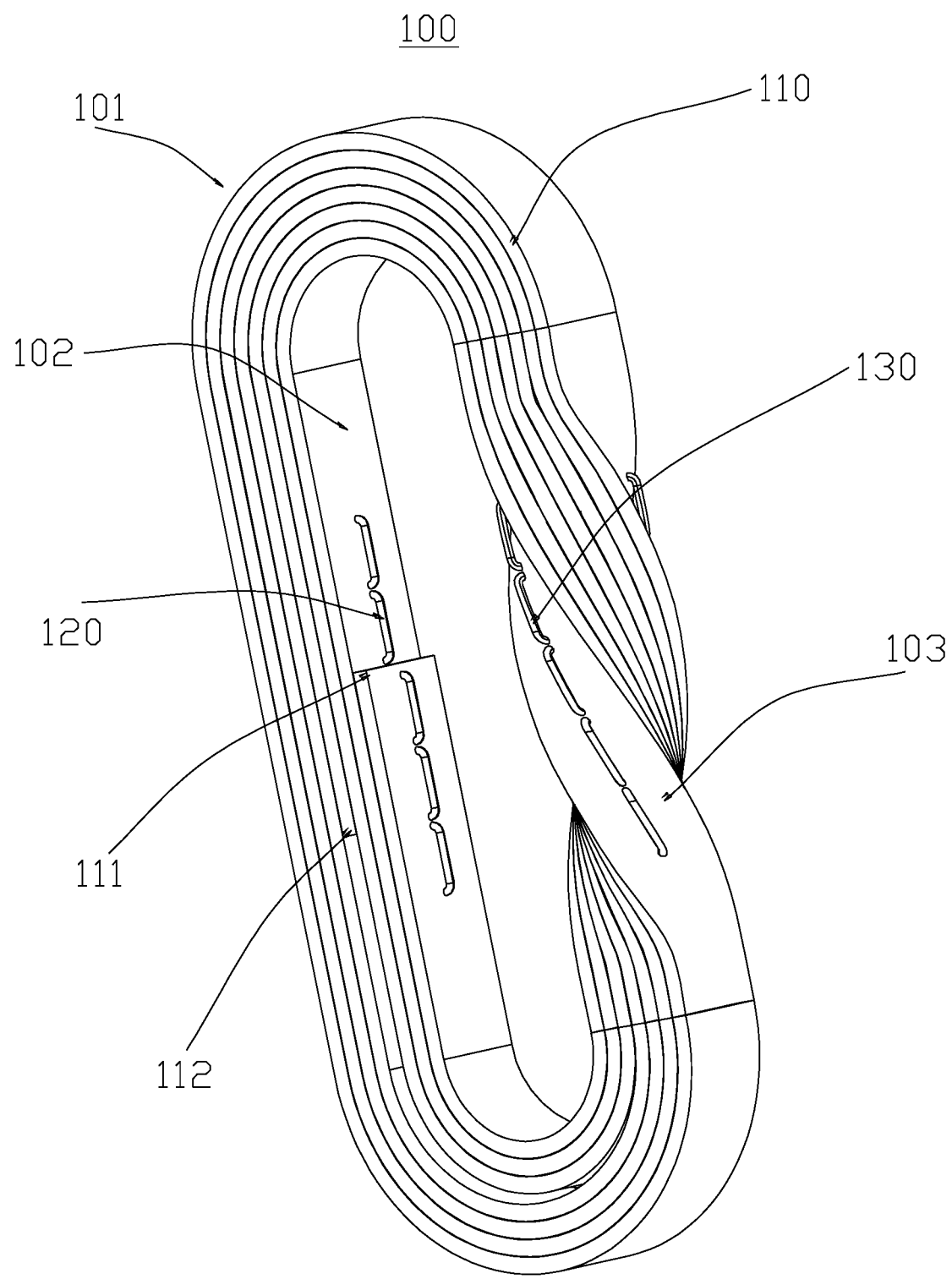
FIG. 3 is a schematic diagram of an entire structure of a ringlike fabric belt of the present disclosure in one angle.
Figure 4:
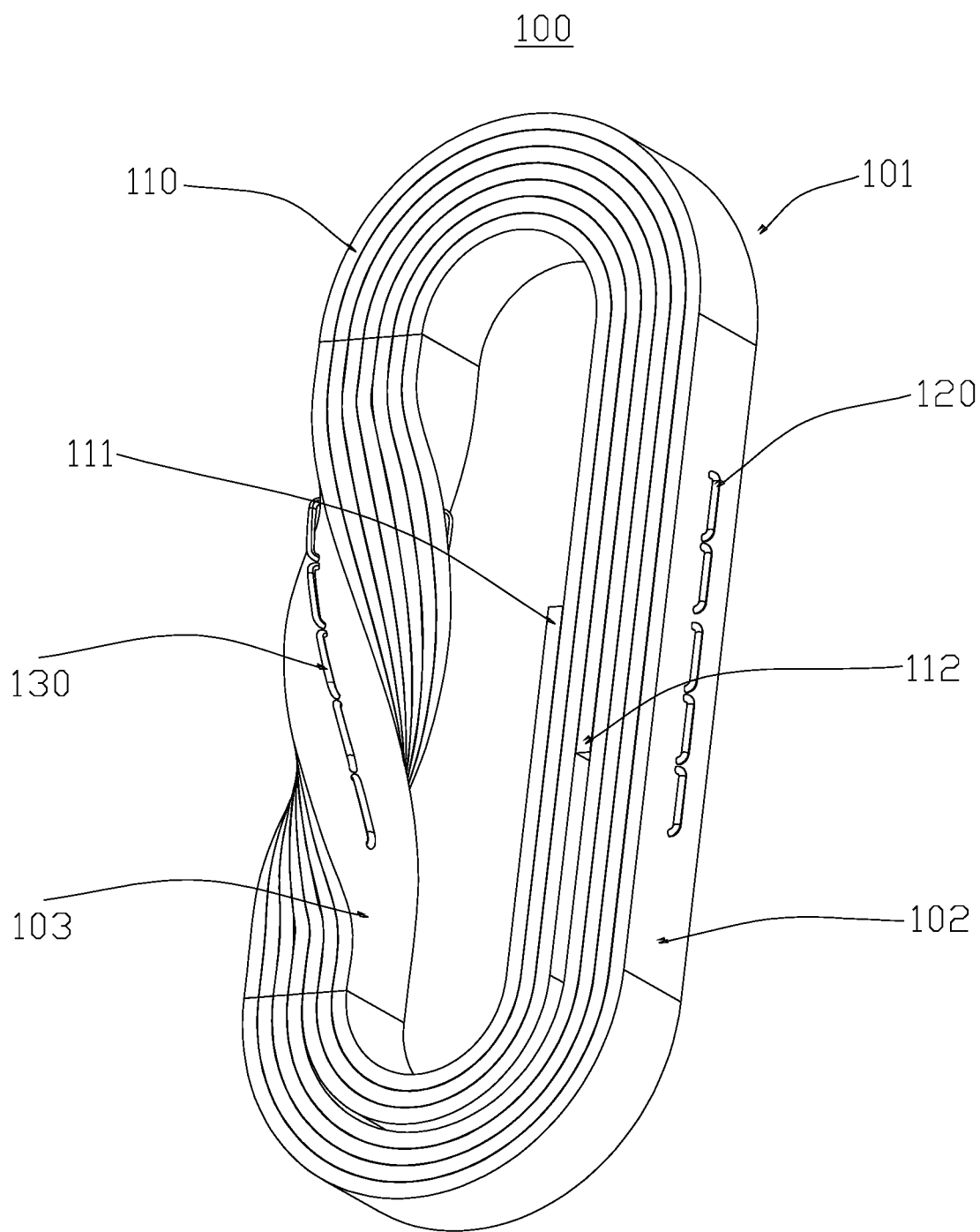
FIG. 4 is a schematic diagram of an entire structure of a ringlike fabric belt of the present disclosure in another angle.
Figure 5:
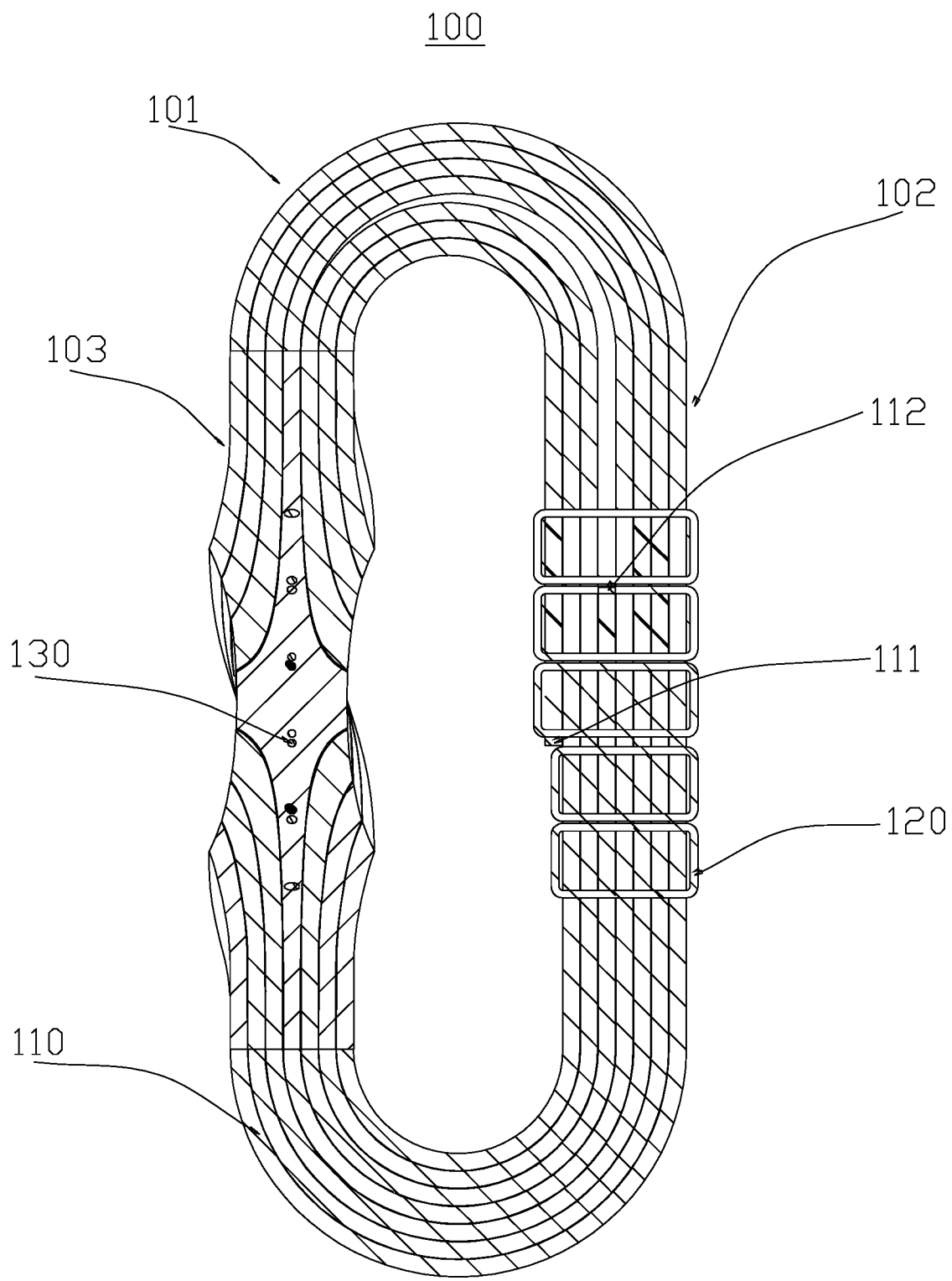
FIG. 5 is a schematic diagram of a cross-sectional structure of a ringlike fabric belt of the present disclosure.

Referring to FIG. 1 to FIG. 5, a ringlike fabric belt traction chain includes several ringlike fabric belts 100 which are fastened in sequence. Each ringlike fabric belt 100 includes:

a fabric layer 110, wherein the fabric layer 110 has a first end 111 and a second end 112, and the fabric layer 110 is coiled and stacked to form a ringlike main body 101; and a first seam 120, wherein the first seam 120 connects the first end 111 and the second end 112 of the fabric layer 110 to the ringlike main body 101.

By the arrangement of the above structure, during use, each fabric layer 110 is repeatedly coiled and stacked, so that each position of the ringlike main body 101 has a plurality of layers of portion fabric layers 110. The thickness of each position of the ringlike main body 101 can be increased, thereby improving the strength of each position of the ringlike main body 101. The first seam 120 can penetrate through the ringlike main body 101 and connect the first end 111 and the second end 112 to a surface of the ringlike main body 101. This can effectively fix the first end 111 and the second end 112, and improve the strength of the product. Furthermore, the ringlike fabric belt 100 composed of the fabric layer 110 and the first seam 120 is prepared from a fabric, so that the ringlike fabric belt has the characteristics of insulation, thermal isolation, and the like, and is light in weight. The traction chain formed by the plurality of ringlike fabric belts 100 that are fastened in sequence also has characteristics of insulation, thermal isolation, light weight, and the like, and can meet the requirements of traction work under an insulation and/or thermal isolation conditions.

In this embodiment, the ringlike main body 101 is a Mobius ring which has a main body part 102 and a spiral part 103; the fabric layer 110 is stacked above and below the main body part 102 in sequence; and the fabric layer 110 is twisted and stacked at the spiral part 103. By the arrangement of the above structure, the ringlike main body 101 in the shape of the Mobius ring has the main body part 102 and the twisted spiral part 103. The twisted spiral part 103 and the main body part 102 have a twisting force. This can prevent the fabric layers stacked on the top and bottom from sliding and being separated from each other, so that the various parts of the fabric layer 110 form a whole, and the stability of the product is improved. Moreover, when the ringlike main body 101 is stressed, the twisted spiral part 103 and the main body part 102 can disperse the force to the various parts of the ringlike main body 101, thereby improving the firmness of the product.

In this embodiment, a spiral angle of the spiral part 103 is 180 degrees. By the arrangement of the above structure, the fabric layer 110 is repeatedly coiled, and will rotate 180 degrees each time when passing through the spiral part 103, thus forming the Mobius ring-shaped ringlike main body 101.

In this embodiment, the first end 111 of the fabric layer 110 is fixed to an inner surface of the ringlike main body 101, and the second end 112 of the fabric layer 110 is clamped and fixed between two adjacent fabric layers located at upper and lower positions. By the arrangement of the above structure, when the traction chain is used to pull an object, two adjacent ringlike fabric belts 100 are tightly pulled against each other, and inner surfaces of the ringlike main bodies 101 of the two ringlike fabric belts press against each other. The first ends 111 of the fabric layers 110 are fixed on the inner surfaces of the ringlike main bodies 101, so that the first ends 111 can be tightly pressed against the surfaces of adjacent portion fabric layers 110 to increase the friction force between them and connect the first ends 111 to adjacent portion fabric layers 110 more tightly. The second ends 112 of the fabric layers 110 are clamped and fixed between two adjacent portion fabric layers 110 located at upper and lower positions. The two portion fabric layers 110 can clamp and fix the second ends 112 of the fabric layers 110, so as to increase the friction force between the two portion fabric layers 110 and the second ends 112 and improve the stability of the product.

In this embodiment, each ringlike fabric belt 100 further includes a second seam 130; and the second seam 130 and the first seam 120 are oppositely arranged on two sides of a center of the ringlike main body 101. By the arrangement of the above structure, the second seam 130 and the first seam 120 are arranged in a manner of being opposite to each other, so that the seams used for connecting the various portion fabric layers 110 may exist on the two sides of the ringlike main body 101. This improves the strength of the product, prevents two adjacent portion fabric layers 110 from being separated from each other, and improves the stability of the product.

In this embodiment, the first seam 120 is repeatedly threaded through each fabric layer 110 that forms the main body part 102, and the second seam 130 is repeatedly threaded through each fabric layer 110 that forms the spiral part 103. By the arrangement of the above structure, the first seam 120 and the second seam 130 are repeatedly threaded through each fabric layer 110, so that the various portion fabric layers 110 are connected together. Moreover, the plurality of repeatedly threaded and stitched seams can further enhance the strength of the product.

In this embodiment, both the first seam 120 and the second seam 130 extend in a direction where a centerline of the ringlike main body 101 is located. By the arrangement of the above structure, the first seam 120 and the second seam 130 are arranged on the centerline of the ringlike main body 101, so that the ringlike main bodies 101 on the two sides of the first seam 120 and the second seam 130 can be uniformly distributed. This prevents the product from deflecting and being twisted under a force. The force on all the parts of the product is uniform, and the strength of the product is improved.

In this embodiment, the fabric layer 110, the first seam 120, and the second seam 130 are all made of polyethylene fibers with an ultra-high molecular weight. By the arrangement of the above structure, the polyethylene fibers with the ultra-high molecular weight have a small density less than 1. Under the same tensile strength, the weight of the traction chain is only about one eighth of that of a steel cable, making the product lighter in weight. Furthermore, the tensile strength is high. With the same diameter, the traction chain has the strength close to that of the steel cable. Moreover, the traction chain also has the characteristics of insulation and thermal isolation and can meet the requirements of traction work under an insulation and/or thermal isolation environment.

Referring to FIG. 1 to FIG. 5, a manufacturing method of a ringlike fabric belt traction chain includes: providing several ringlike fabric belts 100, and fastening the ringlike fabric belts in sequence to form the traction chain, wherein each ringlike fabric belt 100 includes:
- a fabric layer 110, wherein the fabric layer 110 has a first end 111 and a second end 112, and the fabric layer 110 is coiled and stacked to form a ringlike main body 101; and
- a first seam 120, wherein the first seam 120 connects the first end 111 and the second end 112 of the fabric layer 110 to the ringlike main body 101.

During production, each fabric layer 110 is repeatedly coiled and stacked, so that each position of the ringlike main body 101 has a plurality of layers of portion fabric layers 110. The thickness of each position of the ringlike main body 101 can be increased, thereby improving the strength of each position of the ringlike main body 101. The first seam 120 can penetrate through the ringlike main body 101 and connect the first end 111 and the second end 112 to a surface of the ringlike main body 101. This can effectively fix the first end 111 and the second end 112, and improve the strength of the product. Furthermore, the ringlike fabric belt 100 composed of the fabric layer 110 and the first seam 120 is prepared from a fabric, so that the ringlike fabric belt has the characteristics of insulation, thermal isolation, and the like, and is light in weight. The traction chain formed by the plurality of ringlike fabric belts 100 that are fastened in sequence also has characteristics of insulation, thermal isolation, light weight, and the like, and can meet the requirements of traction work under an insulation and/or thermal isolation conditions.

In this embodiment, the ringlike main body 101 is a Mobius ring which has a main body part 102 and a spiral part 103; the fabric layer 110 is stacked above and below the main body part 102 in sequence; and the fabric layer 110 is twisted and stacked at the spiral part 103. By the arrangement of the above structure, the ringlike main body 101 in the shape of the Mobius ring has the main body part 102 and the twisted spiral part 103. The twisted spiral part 103 and the main body part 102 have a twisting force. This can prevent the fabric layers stacked on the top and bottom from sliding and being separated from each other, so that the various parts of the fabric layer 110 form a whole, and the stability of the product is improved. Moreover, when the ringlike main body 101 is stressed, the twisted spiral part 103 and the main body part 102 can disperse the force to the various parts of the ringlike main body 101, thereby improving the firmness of the product.

In this embodiment, a spiral angle of the spiral part 103 is 180 degrees. By the arrangement of the above structure, the fabric layer 110 is repeatedly coiled, and will rotate 180 degrees each time when passing through the spiral part 103, thus forming the Mobius ring-shaped ringlike main body 101.

In this embodiment, the first end 111 of the fabric layer 110 is fixed to an inner surface of the ringlike main body 101, and the second end 112 of the fabric layer 110 is clamped and fixed between two adjacent fabric layers located at upper and lower positions. By the arrangement of the above structure, when the traction chain is used to pull an object, two adjacent ringlike fabric belts 100 are tightly pulled against each other, and inner surfaces of the ringlike main bodies 101 of the two ringlike fabric belts press against each other. The first ends 111 of the fabric layers 110 are fixed on the inner surfaces of the ringlike main bodies 101, so that the first ends 111 can be tightly pressed against the surfaces of adjacent portion fabric layers 110 to increase the friction force between them and connect the first ends 111 to adjacent portion fabric layers 110 more tightly. The second ends 112 of the fabric layers 110 are clamped and fixed between two adjacent portion fabric layers 110 located at upper and lower positions. The two portion fabric layers 110 can clamp and fix the second ends 112 of the fabric layers 110, so as to increase the friction force between the two portion fabric layers 110 and the second ends 112 and improve the stability of the product.

In this embodiment, each ringlike fabric belt 100 further includes a second seam 130; and the second seam 130 and the first seam 120 are oppositely arranged on two sides of a center of the ringlike main body 101. By the arrangement of the above structure, the second seam 130 and the first seam 120 are arranged in a manner of being opposite to each other, so that the seams used for connecting the various portion fabric layers 110 may exist on the two sides of the ringlike main body 101. This improves the strength of the product, prevents two adjacent portion fabric layers 110 from being separated from each other, and improves the stability of the product.

In this embodiment, the first seam 120 is repeatedly threaded through each fabric layer 110 that forms the main body part 102, and the second seam 130 is repeatedly threaded through each fabric layer 110 that forms the spiral part 103. By the arrangement of the above structure, the first seam 120 and the second seam 130 are repeatedly threaded through each fabric layer 110, so that the various portion fabric layers 110 are connected together. Moreover, the plurality of repeatedly threaded and stitched seams can further enhance the strength of the product.

In this embodiment, both the first seam 120 and the second seam 130 extend in a direction where a centerline of the ringlike main body 101 is located. By the arrangement of the above structure, the first seam 120 and the second seam 130 are arranged on the centerline of the ringlike main body 101, so that the ringlike main bodies 101 on the two sides of the first seam 120 and the second seam 130 can be uniformly distributed. This prevents the product from deflecting and being twisted under a force. The force on all the parts of the product is uniform, and the strength of the product is improved.

In this embodiment, the fabric layer 110, the first seam 120, and the second seam 130 are all made of polyethylene fibers with an ultra-high molecular weight. By the arrangement of the above structure, the polyethylene fibers with the ultra-high molecular weight have a small density less than 1. Under the same tensile strength, the weight of the traction chain is only about one eighth of that of a steel cable, making the product lighter in weight. Furthermore, the tensile strength is high. With the same diameter, the traction chain has the strength close to that of the steel cable. Moreover, the traction chain also has the characteristics of insulation and thermal isolation and can meet the requirements of traction work under an insulation and/or thermal isolation environment.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

The invention claimed is:

1. A ringlike fabric belt traction chain, comprising several ringlike fabric belts which are fastened in sequence, wherein each ringlike fabric belt comprises:
   a fabric layer, wherein the fabric layer has a first end and a second end, and the fabric layer is coiled and stacked to form a ringlike main body; and
   a first seam, wherein the first seam connects the first end and the second end of the fabric layer to the ringlike main body;
   wherein the first end of the fabric layer is fixed to an inner surface of the ringlike main body, and the second end of the fabric layer is clamped and fixed between two adjacent fabric layers located at upper and lower positions.

2. The ringlike fabric belt traction chain according to claim 1, wherein the ringlike main body is a Mobius ring which has a main body part and a spiral part; the fabric layer is stacked above and below the main body part in sequence; and the fabric layer is twisted and stacked at the spiral part.

3. The ringlike fabric belt traction chain according to claim 2, wherein a spiral angle of the spiral part is 180 degrees.

4. The ringlike fabric belt traction chain according to claim 2, wherein each ringlike fabric belt further comprises a second seam; and the second seam and the first seam are oppositely arranged on two sides of a center of the ringlike main body.

5. The ringlike fabric belt traction chain according to claim 4, wherein the first seam is repeatedly threaded through each fabric layer that forms the main body part, and the second seam is repeatedly threaded through each fabric layer that forms the spiral part.

6. The ringlike fabric belt traction chain according to claim 4, wherein both the first seam and the second seam extend in a direction where a centerline of the ringlike main body is located.

7. The ringlike fabric belt traction chain according to claim 4, wherein the fabric layer, the first seam, and the second seam are all made of polyethylene fibers with an ultra-high molecular weight.

8. A manufacturing method of a ringlike fabric belt traction chain, comprising providing several ringlike fabric belts, and fastening the ringlike fabric belts in sequence to form the traction chain, wherein each ringlike fabric belt comprises:
   a fabric layer, wherein the fabric layer has a first end and a second end, and the fabric layer is coiled and stacked to form a ringlike main body; and
   a first seam, wherein the first seam connects the first end and the second end of the fabric layer to the ringlike main body;
   wherein the first end of the fabric layer is fixed to an inner surface of the ringlike main body, and the second end of the fabric layer is clamped and fixed between two adjacent fabric layers located at upper and lower positions.

9. The manufacturing method of the ringlike fabric belt traction chain according to claim 8, wherein the ringlike main body is a Mobius ring which has a main body part and a spiral part; the fabric layer is stacked above and below the main body part in sequence; and the fabric layer is twisted and stacked at the spiral part.

10. The manufacturing method of the ringlike fabric belt traction chain according to claim 9, wherein a spiral angle of the spiral part is 180 degrees.

11. The manufacturing method of the ringlike fabric belt traction chain according to claim 9, wherein each ringlike fabric belt further comprises a second seam; and the second seam and the first seam are oppositely arranged on two sides of a center of the ringlike main body.

12. The manufacturing method of the ringlike fabric belt traction chain according to claim 11, wherein the first seam is repeatedly threaded through each fabric layer that forms the main body part, and the second seam is repeatedly threaded through each fabric layer that forms the spiral part.

13. The manufacturing method of the ringlike fabric belt traction chain according to claim 11, wherein both the first seam and the second seam extend in a direction where a centerline of the ringlike main body is located.

14. The manufacturing method of the ringlike fabric belt traction chain according to claim 11, wherein the fabric layer, the first seam, and the second seam are all made of polyethylene fibers with an ultra-high molecular weight.

* * * * *

EX PARTE REEXAMINATION CERTIFICATE (13147th)
United States Patent
Lin

(10) Number: US 12,146,549 C1
(45) Certificate Issued: Jan. 20, 2026

(54) RINGLIKE FABRIC BELT TRACTION CHAIN AND MANUFACTURING METHOD THEREOF

(71) Applicant: Zhenghong Lin, Shanghai (CN)

(72) Inventor: Zhenghong Lin, Shanghai (CN)

(73) Assignee: SHANGHAI JINLI SPECIAL ROPE CO., LTD., Shanghai (CN)

Reexamination Request:
No. 90/019,868, Feb. 27, 2025

Reexamination Certificate for:
Patent No.: 12,146,549
Issued: Nov. 19, 2024
Appl. No.: 18/641,376
Filed: Apr. 21, 2024

(51) Int. Cl.
*F16G 13/20* (2006.01)
(52) U.S. Cl.
CPC .................................... *F16G 13/20* (2013.01)
(58) Field of Classification Search
None
See application file for complete search history.

(56) References Cited

To view the complete listing of prior art documents cited during the proceeding for Reexamination Control Number 90/019,868, please refer to the USPTO's Patent Electronic System.

*Primary Examiner* — William V Gilbert

(57) ABSTRACT

The present disclosure provides a ringlike fabric belt traction chain and a manufacturing method of the ringlike fabric belt traction chain. A ringlike fabric belt traction chain includes several ringlike fabric belts which are fastened in sequence, wherein each ringlike fabric belt includes: a fabric layer, wherein the fabric layer has a first end and a second end, and the fabric layer is coiled and stacked to form a ringlike main body; and a first seam, wherein the first seam connects the first end and the second end of the fabric layer to the ringlike main body. During use, each fabric layer is repeatedly coiled and stacked, so that each position of the ringlike main body has a plurality of layers of portion fabric layers. The thickness of each position of the ringlike main body can be increased, thereby improving the strength of each position of the ringlike main body.

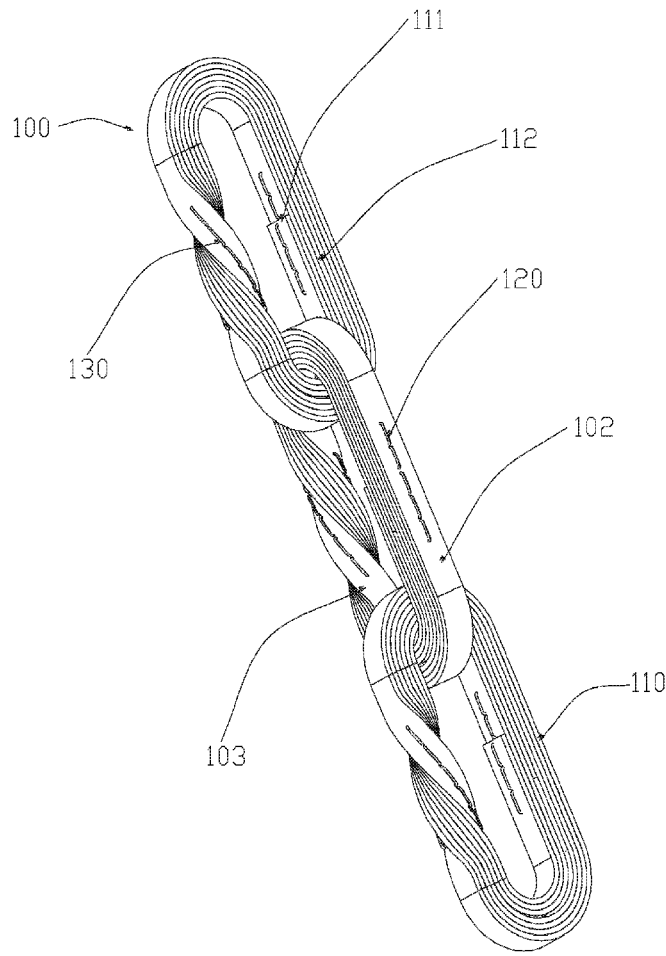

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-14 are cancelled.

* * * * *